United States Patent
Oakley

(10) Patent No.: US 8,391,632 B2
(45) Date of Patent: Mar. 5, 2013

(54) IMAGE PROCESSING USING FUNCTION OPTIMIZATION TO ESTIMATE IMAGE NOISE

(75) Inventor: John Peter Oakley, Manchester (GB)

(73) Assignee: DMIST Research Limited, Stockport (GB)

( * ) Notice: Subject to any disclaimer, the term of this patent is extended or adjusted under 35 U.S.C. 154(b) by 1230 days.

(21) Appl. No.: 11/908,736

(22) PCT Filed: Mar. 16, 2006

(86) PCT No.: PCT/GB2006/000974
§ 371 (c)(1),
(2), (4) Date: Sep. 14, 2007

(87) PCT Pub. No.: WO2006/097752
PCT Pub. Date: Sep. 21, 2006

(65) Prior Publication Data
US 2008/0112641 A1    May 15, 2008

Related U.S. Application Data

(60) Provisional application No. 60/665,491, filed on Mar. 25, 2005.

(30) Foreign Application Priority Data

Mar. 17, 2005    (GB) .................................. 0505443.2

(51) Int. Cl.
*G06K 9/40* (2006.01)
(52) U.S. Cl. ........................................ 382/274; 382/275
(58) Field of Classification Search ........... 382/274–275
See application file for complete search history.

(56) References Cited

U.S. PATENT DOCUMENTS

| | | | | |
|---|---|---|---|---|
| 4,970,598 A * | 11/1990 | Vogel | ............................ | 358/461 |
| 5,257,121 A * | 10/1993 | Steinberg | ...................... | 358/447 |
| 5,303,051 A * | 4/1994 | Levesque et al. | ............... | 348/31 |
| 5,548,659 A * | 8/1996 | Okamoto | ...................... | 382/107 |
| 5,719,567 A * | 2/1998 | Norris | ........................... | 340/953 |
| 5,886,662 A * | 3/1999 | Johnson | ..................... | 342/25 A |
| 5,925,875 A * | 7/1999 | Frey | ........................... | 250/208.1 |
| 6,028,624 A * | 2/2000 | Watkins | ....................... | 348/122 |
| 6,104,839 A * | 8/2000 | Cok et al. | ..................... | 382/254 |
| 6,243,498 B1 * | 6/2001 | Chen et al. | .................... | 382/260 |
| 6,462,766 B1 | 10/2002 | Roeber et al. | | |
| 6,462,768 B1 * | 10/2002 | Oakley | ............................ | 348/31 |

(Continued)

FOREIGN PATENT DOCUMENTS

| | | |
|---|---|---|
| EP | 0839361 A | 5/1998 |
| EP | 839361 B1 * | 10/1999 |

(Continued)

OTHER PUBLICATIONS

Edmondson, D. et al., "Automatic Correction for Atmospheric Degradation in Infrared Iamges", Mar. 19, 1998, RTO MP-1, p. 9-1-9-7.*

(Continued)

*Primary Examiner* — Matthew Bella
*Assistant Examiner* — Gandhi Thirugnanam
(74) *Attorney, Agent, or Firm* — Reising Ethington P.C.

(57) ABSTRACT

A method of processing image data representing an image of a scene to generate an estimate of noise present in the image data. The method comprises evaluating a function for different values of said estimate, said function taking as input an estimate of said noise, and determining an estimate of said noise for which said function has an optimum value.

14 Claims, 4 Drawing Sheets

U.S. PATENT DOCUMENTS

| | | | |
|---|---|---|---|
| 6,681,054 B1* | 1/2004 | Gindele | 382/272 |
| 6,718,068 B1* | 4/2004 | Gindele et al. | 382/254 |
| 6,807,300 B1* | 10/2004 | Gindele et al. | 382/167 |
| 6,934,421 B2* | 8/2005 | Gindele et al. | 382/260 |
| 7,092,579 B2* | 8/2006 | Serrano et al. | 382/254 |
| 7,268,925 B1* | 9/2007 | Green | 358/486 |
| 7,486,835 B2* | 2/2009 | Zhang et al. | 382/274 |
| 7,711,047 B2* | 5/2010 | Matsushita et al. | 375/240.03 |
| 8,290,294 B2* | 10/2012 | Kopf et al. | 382/274 |
| 2003/0039401 A1* | 2/2003 | Gallagher et al. | 382/275 |
| 2003/0179944 A1* | 9/2003 | Gindele et al. | 382/260 |
| 2003/0194127 A1* | 10/2003 | Hubel et al. | 382/165 |
| 2003/0198400 A1* | 10/2003 | Alderson et al. | 382/274 |
| 2004/0051796 A1* | 3/2004 | Kelly et al. | 348/243 |
| 2004/0051797 A1 | 3/2004 | Kelly et al. | |
| 2005/0152586 A1* | 7/2005 | Shatford | 382/124 |
| 2005/0244075 A1* | 11/2005 | Shaked et al. | 382/260 |
| 2007/0110319 A1* | 5/2007 | Wyatt et al. | 382/199 |
| 2008/0056575 A1* | 3/2008 | Behm et al. | 382/180 |
| 2008/0112641 A1* | 5/2008 | Oakley | 382/274 |
| 2008/0304764 A1* | 12/2008 | Lin et al. | 382/275 |
| 2009/0190795 A1* | 7/2009 | Derkalousdian et al. | 382/100 |
| 2009/0304284 A1* | 12/2009 | Kempf et al. | 382/190 |
| 2010/0040300 A1* | 2/2010 | Kang et al. | 382/255 |
| 2010/0061593 A1* | 3/2010 | MacDonald et al. | 382/103 |
| 2010/0067823 A1* | 3/2010 | Kopf et al. | 382/274 |
| 2010/0188582 A1* | 7/2010 | Hsu | 348/607 |
| 2010/0195926 A1* | 8/2010 | Sasaki | 382/260 |

FOREIGN PATENT DOCUMENTS

| | | |
|---|---|---|
| JP | 05-312653 | 11/1993 |
| WO | WO9741682 A | 11/1997 |

OTHER PUBLICATIONS

John P. Oakley and Hong Bu, "Correction of Simple Contrast Loss in Color Images", IEEE Transactions on Image Processing, vol. 16, No. 2, Feb. 2007, 12 pages.

Japanese Office Action for corresponding JP application No. 2008-501418 dated Aug. 28, 2012, 3 pages. (translated).

* cited by examiner

IMAGE PROCESSING USING FUNCTION OPTIMIZATION TO ESTIMATE IMAGE NOISE

TECHNICAL FIELD

The present invention relates to image processing methods, and more particularly but not exclusively to methods for enhancing images which are at least partially affected by the effects of noise.

BACKGROUND OF THE INVENTION

There are many sources of noise which may degrade an image of a scene. For example an image of a scene will often be degraded by optical scattering of light caused, for example by fog or mist. This optical scattering results in additional lightness being present in some parts of the image, and has been referred to as "airtight" in the literature. It is desirable to process an image so as to remove components of pixel values which are attributable to airtight.

If the distance between a camera position and all points of a scene represented by an image generated by the camera is approximately constant, airtight can be estimated and removed by applying equation (1) to each pixel of the image:

$$y = m(x-c) \quad (1)$$

where:
x is an original pixel value;
c is a correction selected to represent "airlight";
m is a scaling parameter; and
y is a modified pixel value.

Assuming that parameter c is correctly chosen, processing each pixel of a monochrome image in accordance with equation (1) will enhance an image by removing air light. However determination of an appropriate value for the parameter c is often problematic.

Various known methods exist for estimating the parameter c by using contrast measurements such as a ratio of the standard deviation of pixel values to the mean of pixel values. However, such contrast measures do not discriminate between airlight-induced contrast loss and inherently low contrast scenes. For example an image of sand dunes would often provide little contrast between the light and dark parts of the scene, even when no airtight is present. Thus ad-hoc schemes to determine the parameter c will sometimes result in severe image distortion.

The method described above with reference to equation (1) is applicable to a monochrome image. Further problems arise if a colour image is to be processed. Typically the airtight contribution to a pixel value, and hence the value of the parameter c, will depend upon the wavelength (colour) of the light. Thus, if equation (1) is to be applied to colour images, different values of the parameter c may be needed for red, green and blue channels of the image.

The methods described above assume that the camera position is equidistant from all points in a scene represented by an image. Published European Patent EP 0839361 describes a method developed by one of the present inventors, in which different values of the parameter c in equation (1) are used for different pixels, in dependence upon distance between the camera position and a position in a scene represented by that pixel. This invention arose from a realisation that backscattered light may vary in dependence upon the distance between a camera position and a position in a scene.

SUMMARY OF THE INVENTION

It is an object of embodiments of the present invention to obviate or mitigate at least some of the problems outlined above.

According to the present invention, there is provided, a method of processing image data representing an image of a scene to generate an estimate of noise present in the image data. The method involves a function taking as input an estimate of the noise. The function is evaluated for a plurality of different values of the estimate, and an estimate for which the function has an optimum value is determined. The optimum value may be a stationary point of a function, for example a minimum.

Thus, the present invention provides a robust method of determining noise present in an image by simply evaluating a function and determining a value of the noise estimate for which the function has an optimum value.

The term noise as used in this document is used to mean any artefact of an image which imparts slow varying offsets to that image. Examples of noise are described in further detail below although it will be appreciated that examples of such noise include airtight.

The image data may comprise pixel values for each of a plurality of pixels of the image, and the function may take as input at least a subset of the pixel values.

The method may further comprise filtering the image data to generate filtered image data comprising filtered pixel values for each of the image pixels. The function may then take as input at least a subset of said filtered pixel values. The subset is preferably selected so as to be the same subset of pixels for which the function takes as input pixel values.

The function described above may be of the form $$S(\lambda) = \frac{1}{K}\sum_{k=1}^{k=K}\left(\frac{p_k - \overline{p_k}}{\overline{p_k} - \lambda}\right)^2 \cdot \exp\frac{1}{K}\sum_{k=1}^{k=K}(\ln(\overline{p_k} - \lambda)^2) \quad (2)$$

where:
K is the number of pixels to be processed;
$p_k$ is the value of pixel k
$\overline{p_k}$ is the value of pixel k after application of the lowpass filter described above;
λ is the value of the parameter; and
S(λ) is the function to be optimised.

The optimum value may be determined using any of the large number of numerical analysis techniques which are well known in the art. Such numerical analysis techniques preferably begin with an initial estimate of zero for the noise included in the image.

It is known that some noise present within images varies in dependence between the distance between a camera position and a position in the scene. Such variants may be taken into account using the methods set out above by generating a plurality of different estimates.

The invention also provides a method of removing noise from an image. The method comprises estimating noise included in the image using a method as set out above, and then processing each pixel of the image to remove the estimate of said noise to generate said output pixel values.

The method of removing noise may further comprise multiplying the output pixel values by a predetermined coefficient. Multiplying output pixel values by a predetermined coefficient may provide illumination compensation using one of a number of well known illumination compensation techniques.

The noise included in the image maybe at least partially attributable to one or more of: atmospheric back scattered light, a dark current effect of a camera, or dirt on a camera lens.

According to a further aspect of the present invention, there is provided, a carrier medium carrying computer readable instructions configured to cause a computer to carry out a method according to any proceeding claims.

The invention further provides a computer apparatus for generating an estimate of noise present in image data representing an image. The apparatus comprises a program memory containing processor readable instructions, and a processor configured to read and execute instructions stored in said program memory. The processor readable instructions comprise instructions configured to cause the computer to carry out a method as described above.

According to a further aspect of the present invention there is provided, a method of processing a plurality of frames of video data to generate enhanced video data. The method comprises processing a first frame of video data to generate an estimate of noise included within said frame of video data, storing data indicative of said estimate of noise, processing at least one further frame of video data to remove noise from said further frame of video data using said stored estimate of noise included in said first frame of video data and outputting an enhanced frame of video data generated using said further frame of video data.

Thus, by using the methods set out above it is possible for processing of a first frame of video data to proceed relatively slowly while processing of the at least one further frame of video data may take place relatively quickly so as to prevent artefacts of 'jeridness' being apparent in the output video data.

The first frame of video data may be processed in accordance with the methods set out above. This processing may further generate a contrast enhancement parameter.

BRIEF DESCRIPTION OF THE DRAWINGS

Embodiments of the present invention will now be described, by way of example, with reference to the accompanying drawings, in which.

DETAILED DESCRIPTION OF THE ILLUSTRATED EMBODIMENTS

Pixel values of an image may include a component attributable to noise caused by atmospheric backscattered light, often referred to as airtight. Such noise can be removed from the image using equation (1) set out above, and recalled below:

$$y = m(x-c) \qquad (1)$$

where:
x is an original pixel value;
c is a correction selected to represent "airlight";
m is a scaling parameter; and
y is a modified pixel value.

Figure 1:
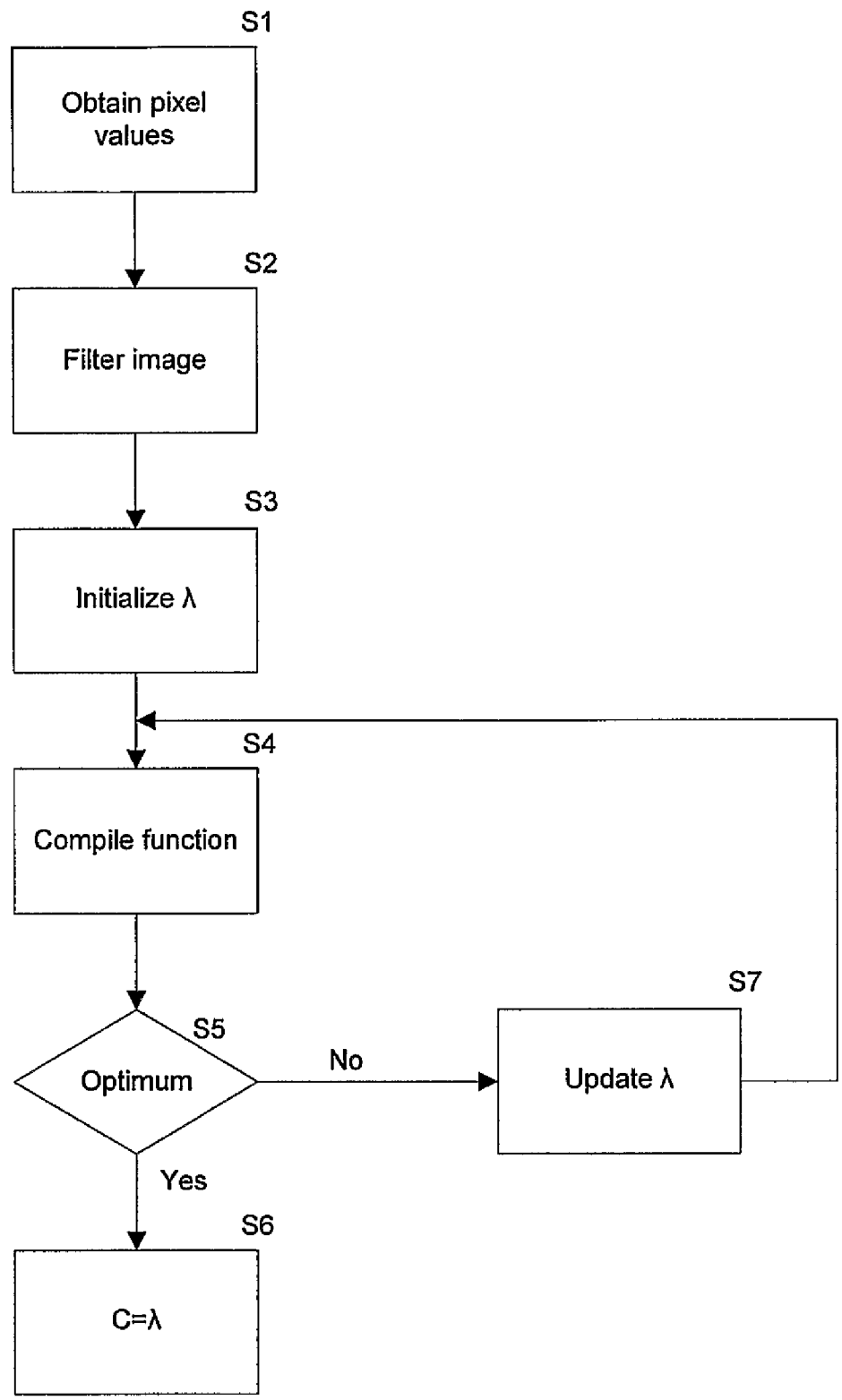
FIG. 1 is a flowchart of an image processing method in accordance with the present invention.

An embodiment of the present invention provides a method for estimating a value of the parameter c. This method is illustrated in the flowchart of FIG. 1. The method operates by sampling pixel values associated with at least a subset of the pixels defining the image, inputting these values into a parametric function, and determining a value for the parameter of the parametric function for which the function has an optimum value. The value of the parameter so determined is the value generated for the parameter c in equation (1).

Referring to FIG. 1, at step S1 pixel values p associated with at least some of the pixels within the image to be processed are sampled. At step S2 a low-pass filter is applied to the image to be processed to generate filtered pixel values $\bar{p}$ for each of the image pixels. The filter is preferably a low-pass filter having a Gaussian shaped kernel and a value of sigma equal to approximately five. The generation of such a low pass filter will be well known to one of ordinary skill in the art.

At step S3 the parameter $\lambda$ of the parametric function (described below) is initialised, typically to a value of 0. The parametric function evaluated at step S4 of FIG. 1 is that of equation (2):

$$S(\lambda) = \frac{1}{K} \sum_{k=1}^{k=K} \left(\frac{p_k - \bar{p}_k}{\bar{p}_k - \lambda}\right)^2 \cdot \exp\frac{1}{K} \sum_{k=1}^{k=K} (\ln(\bar{p}_k - \lambda)^2) \qquad (2)$$

where:
K is the number of pixels to be processed;
$p_k$ is the value of pixel k
$\bar{p}_k$ is the value of pixel k after application of the lowpass filter described above;
$\lambda$ is the value of the parameter; and
$S(\lambda)$ is the function to be optimised.

As mentioned above, $\lambda$ is initialised to a value of 0 at step S3 and equation (2) is then evaluated at step S4. At step S5 a check is made to determine whether the evaluated value of equation (2) is an optimum value, in this case a minimum value. When it is determined that this is the case, parameter c is set to be the determined value of $\lambda$ at step S6. Until a value of $\lambda$ for which $S(\lambda)$ is a minimum is found, $\lambda$ is updated at step S7, and processing returns to step S4.

Location of the minimum value of $S(\lambda)$ (step S3 to S7) can be carried out using a number of known numerical optimisation techniques. Further details of one such technique are presented below.

It has been indicated that processing is carried out to determine a value of $\lambda$ for which the function $S(\lambda)$ is a minimum. It is now shown that such a value of $\lambda$ will be a good estimate for the parameter c in equation (1).

Any image can be regarded as a collection of regions with each region corresponding to some kind of visible surface. For example a tree may be seen as collection of foliage, trunk and branch regions. Each region has a certain spectral reflectivity which is associated with its local pigmentation. Within each region there is a variation in brightness that is mainly due to macroscopic variations in local surface orientation. This consideration of an image corresponds to a fairly general and basic model for image texture.

A key feature of the model described above is that the fractional variation in brightness is approximately independent of the actual brightness. Any offsets due to airtight will change this feature and so are detectable. This is used as a basis for the processing described above with reference to FIG. 1 and equation (2).

In the described embodiment the local texture variation is assumed to have a Normal (Gaussian) distribution.

An image to be processed is assumed to contain M regions and the mean brightness of the a region m is $R_m$, where m=1 ... M. No loss of generality is implied as M could be very large and the regions very small. An explicit segmentation of the image into these M regions is not performed.

The total number of pixels in the image is denoted by K, and the fraction of those pixels in region m is denoted by $K_m$. The $k_{th}$ pixel in region m is denoted by $p_k^m$.

The $k_{th}$ pixel in region m ($p_k^m$) is represented as follows:

$$p_k^m = R_m(1+N)+c, \qquad (3)$$

where:
- N=N(0,σ) is a Normal random variable with zero mean, standard deviation σ;
- c is a scalar constant indicative of airtight.

The low-pass filter described above smoothes out random fluctuations in the local pixel value $p_k^m$ to produce a "smoothed" value $\overline{p_k^m}$ for each pixel.

If the spatial extent of the filter is sufficiently large for the purpose of smoothing but still small with respect to the size of the image region (so that border effects are not significant) then:

$$p_k^m \approx R_m + c \quad (4)$$

That is, the filtering removes the variation represented by normal variable N.

Recalling equation (2):

$$S(\lambda) = \frac{1}{K}\sum_{k=0}^{k<K}\left(\frac{p_k - \overline{p_k}}{\overline{p_k} - \lambda}\right)^2 \cdot \exp\frac{1}{k}\sum_{k=0}^{k<K}(\ln(\overline{p_k} - \lambda)^2) \quad (2)$$

While equation (2) requires summations over all pixels of the image, it can be rewritten in terms of each region m of the M regions, recalling that $K_m$ is the fraction of pixels in region m.

Recalling also equations (3) and (4), equation (2) can be written as:

$$S(\lambda) = \sum_{m=1}^{m=M} K_m\left(\frac{((R_m(1+N)+c)-(R_m+c))^2}{(R_m+c-\lambda)^2}\right) \cdot \exp\left(\sum_{m=1}^{m=M}(K_m \cdot \ln(R_m+c-\lambda)^2)\right) \quad (5)$$

Simplifying equation (5), and recalling that N=N(0,σ) gives:

$$S(\lambda) = \sum_{m=1}^{m=M} K_m\left(\frac{R_m^2 \sigma^2}{(R_m+c-\lambda)^2}\right) \cdot \exp\left(\sum_{m=1}^{m=M}(K_m \cdot \ln(R_m+c-\lambda)^2)\right) \quad (6)$$

given that $\sigma^2$ is the expectation value of the square of N.

Define:

$$u = c - \lambda \quad (7)$$

and substitute equation (7) into equation (6):

$$S(c-u) = \sigma^2\left(\sum_{m=1}^{m=M} K_m \frac{R_m^2}{(R_m+u)^2}\right) \cdot \exp\left(2\sum_{m=1}^{m=M} K_m \ln(R_m+u)\right) \quad (8)$$

Define:

$$f = \sum_{m=1}^{m=M} K_m \frac{R_m^2}{(R_m+u)^2} \quad (9)$$

and $$g = \exp\left(2\sum_{m=1}^{m=M} K_m \ln(R_m+u)\right) \quad (10)$$

Differentiating equation (9) with respect to u gives:

$$\frac{df}{du} = -2\sum_{m=1}^{m=M} K_m \frac{R_m^2}{(R_m+u)^3} \quad (11)$$

Differentiating equation (10) with respect to u gives:

$$\frac{dg}{du} = 2\exp\left(2\sum_{m=1}^{m=M} K_m \ln(R_m+u)\right) \cdot \sum_{m=1}^{m=M} K_m \frac{1}{R_m+u} \quad (12)$$

From equation (8):

$$S(\lambda) = \sigma^2 f \cdot g \quad (13)$$

Therefore:

$$\frac{dS}{du} = \sigma^2 d(f \cdot g) = \sigma^2(df \cdot g + f \cdot dg) \quad (14)$$

Substituting equations (9), (10), (11) and (12) into equation (14) gives:

$$\frac{dS}{du} = -2\sigma^2\left(\sum_{m=1}^{m=M} K_m \frac{R_m^2}{(R_m+u)^3}\right)\exp\left(2\sum_{m=1}^{m=M} K_m \ln(R_m+u)\right) + \quad (15)$$

$$2\sigma^2\left(\sum_{m=1}^{m=M} K_m \frac{1}{R_m+u}\right)$$

$$\exp\left(2\sum_{m=1}^{m=M} K_m \ln(R_m+u)\right)\left(\sum_{m=1}^{m=M} K_m \frac{R_m^2}{(R_m+u)^2}\right)$$

Differentiating equation (7) with respect to λ gives:

$$\frac{du}{d\lambda} = -1 \quad (16)$$

It can be stated that:

$$\frac{dS}{d\lambda} = \frac{dS}{du} \cdot \frac{du}{d\lambda} \quad (17)$$

That is $$\frac{dS}{d\lambda} = -2\sigma^2\left(\sum_{m=1}^{m=M} K_m \frac{R_m^2}{(R_m+u)^3}\right)\exp\left(2\sum_{m=1}^{m=M} K_m \ln(R_m+u)\right) - \quad (18)$$

$$2\sigma^2\left(\sum_{m=1}^{m=M} K_m \frac{1}{R_m+u}\right)$$

$$\exp\left(2\sum_{m=1}^{m=M} K_m \ln(R_m+u)\right)\left(\sum_{m=1}^{m=M} K_m \frac{R_m^2}{(R_m+u)^2}\right)$$

It has been stated above that $\lambda = c$ when S is a minimum, that is when $$\frac{dS}{d\lambda} = 0.$$

If $\lambda = c$, then from equation (7) $u = 0$. Substituting $u = 0$ into equation (18) gives:

$$\frac{dS}{d\lambda} = 2\sigma^2 \left( \sum_{m=1}^{m=M} K_m \frac{1}{R_m} \right) \exp\left( 2 \sum_{m=1}^{m=M} K_m \ln R_m \right) - \qquad (19)$$

$$2\sigma^2 \left( \sum_{m=1}^{m=M} K_m \frac{1}{R_m} \right) \exp\left( 2 \sum_{m=1}^{m=M} K_m \ln R_m \right) \left( \sum_{m=1}^{m=M} K_m \right)$$

Given that $$\left( \sum_{m=1}^{m=M} K_m \right) = 1,$$

it can be seen that $$\frac{dS}{d\lambda} = 0.$$

This supports the claim that equation (2) has a stationary point when $\lambda = c$. This means that c may be determined by applying an efficient numerical search procedure to the equation (2).

Having shown that a value of $\lambda$ for which $S(\lambda)$ is a minimum will provide a good estimate for c, a method for minimization of the function $S(\lambda)$ is now described. The simplest way to minimize the function of equation (2) is to directly evaluate values of equation (2). However, this formulation of the cost function suffers from numerical inaccuracies. In general terms, for numerical optimization algorithms to work efficiently the target function must be a continuous and smooth function of its parameters. An alternative, but equivalent, formulation of the cost function is described below. This formulation is preferred because it leads to more rapid determination of the optimum value of $\lambda$. An example of a suitable optimization code is the routine E04UCC from the Numerical Algorithms Group Ltd, Oxford.

Image data is processed on a row by row basis for each row i. The results of this row by row processing are then combined in a recursive manner.

From equation (2):

$$s(\lambda) = \overline{\left(\frac{P - \overline{p}}{p - \lambda}\right)^2} \cdot \overline{\exp(\ln(\overline{p} - \lambda)^2}) \qquad (20)$$

Then define:

$$RS(i) = \frac{1}{M} \sum_{m=1}^{M} \frac{(p_m - \overline{p_m})^2}{(\overline{p_m} - \lambda_i)^2} \qquad (21)$$

$$RL(i) = \frac{1}{M} \sum_{m=1}^{M} \ln(\overline{p_m} - \lambda_i)^2 \qquad (22)$$

for a given row i, where M is the number of columns and m is the column currently being processed.

$$RTL(n) = \frac{1}{n} \sum_{i=1}^{n} RL(i) \qquad (23)$$

Where n is the number of rows. Then it can be seen that:

$$S(n) = \frac{1}{n} \left[ \sum_{i=1}^{n} RS(i) \right] \cdot \exp(RTL(n)) \qquad (24)$$

$$S(n+1) = \frac{1}{n+1} \left[ \sum_{i=1}^{n+1} RS(i) \right] \cdot \exp(RTL(n+1)) \qquad (25)$$

Recalling the definition of RTL(n) from equation (23) equation 25 can be rewritten as:

$$S(n+1) = \frac{1}{n+1} \left[ \sum_{i=1}^{n+1} RS(i) \right] \cdot \exp\left[ \frac{1}{n+1} \sum_{i=1}^{n+1} RL(i) \right] \qquad (26)$$

Rearranging the summations of equation 26 gives:

$$S(n+1) = \frac{1}{n+1} \left[ \left( \sum_{i=1}^{n} RS(i) \right) + RS(n+1) \right] \cdot \exp \qquad (27)$$

$$\left\{ \frac{1}{n+1} \left[ \left( \sum_{i=1}^{n} RL(i) \right) + RL(n+1) \right] \right\}$$

Rearranging gives:

$$S(n+1) = \left[ \left( \frac{1}{n+1} \sum_{i=1}^{n} RS(i) \right) + \frac{RS(n+1)}{n+1} \right] \cdot \qquad (28)$$

$$\exp\left[ \left( \frac{1}{n+1} \sum_{i=1}^{n} RL(i) \right) + \frac{RL(n+1)}{n+1} \right]$$

Given that the exponential of a sum is equal to the multiplication of the exponentials of the sum's components, equation 28 can be rewritten as:

$$S(n+1) = \left[ \left( \frac{1}{n+1} \sum_{i=1}^{n} RS(i) \right) + \frac{RS(n+1)}{n+1} \right] \cdot \qquad (29)$$

$$\exp\left[ \frac{1}{n+1} \sum_{i=1}^{n} RL(i) \right] \cdot \exp\left[ \frac{RL(n+1)}{n+1} \right]$$

Which can be rewritten as:

$$S(n+1) = \left[ \left( \frac{n}{n+1} \cdot \frac{1}{n} \sum_{i=1}^{n} RS(i) \right) + \frac{RS(n+1)}{n+1} \right] \cdot \qquad (30)$$

$$\exp\left[ \frac{n}{n+1} \cdot \frac{1}{n} \sum_{i=1}^{n} RL(i) \right] \cdot \exp\left[ \frac{RL(n+1)}{n+1} \right]$$

Which, recalling the definition of RTL(n) from equation (23) gives:

$$S(n+1) = \left[ \left( \frac{n}{n+1} \cdot \frac{1}{n} \sum_{i=1}^{n} RS(i) \right) + \frac{RS(n+1)}{n+1} \right] \cdot \qquad (31)$$

$$\exp\left[ \frac{n}{n+1} \cdot \frac{1}{n} \sum_{i=1}^{n} RL(i) \right] \cdot \exp\left[ \frac{RL(n+1)}{n+1} \right]$$

Multiplying out of the expression of equation (31) gives:

$$S(n+1) = \frac{n}{n+1} \cdot \frac{1}{n}\left[\sum_{i=1}^{n} RS(i)\right] \cdot \exp\left[\frac{n}{n+1}RTL(n)\right] \cdot \exp\left[\frac{RL(n+1)}{n+1}\right] + \frac{RS(n+1)}{n+1} \cdot \exp\left[\frac{RL(n+1)}{n+1}\right] \cdot \exp\left[\frac{n}{n+1}RTL(n)\right] \quad (32)$$

Which can be rewritten as:

$$S(n+1) = \frac{n}{n+1} \cdot \frac{1}{n}\left[\sum_{i=1}^{n} RS(i)\right] \cdot \exp\left[\left(1+\frac{-1}{n+1}\right) \cdot RTL(n)\right] \cdot \exp\left[\frac{RL(n+1)}{n+1}\right] + \frac{RS(n+1)}{n+1} \cdot \exp\left[\frac{RL(n+1)}{n+1}\right] \cdot \exp\left[\frac{n}{n+1}RTL(n)\right] \quad (33)$$

Which can be rewritten as:

$$S(n+1) = \frac{n}{n+1} \cdot \frac{1}{n}\left[\sum_{i=1}^{n} RS(i)\right] \cdot \exp\left[RTL(n) + \frac{-1}{n+1}RTL(n)\right] \cdot \exp\left[\frac{RL(n+1)}{n+1}\right] + \frac{RS(n+1)}{n+1} \cdot \exp\left[\frac{RL(n+1)}{n+1}\right] \cdot \exp\left[\frac{n}{n+1}RTL(n)\right] \quad (34)$$

Rewriting the second term of the multiplication gives:

$$S(n+1) = \frac{n}{n+1} \cdot \frac{1}{n}\left[\sum_{i=1}^{n} RS(i)\right] \cdot \exp[RTL(n)] \cdot \exp\left[\frac{-1}{n+1}RTL(n)\right] \cdot \exp\left[\frac{RL(n+1)}{n+1}\right] + \frac{RS(n+1)}{n+1} \cdot \exp\left[\frac{RL(n+1)}{n+1}\right] \cdot \exp\left[\frac{n}{n+1}RTL(n)\right] \quad (35)$$

Recalling the definition of S(n) from equation (24) gives:

$$S(n+1) = \frac{n}{n+1} \cdot S(n) \cdot \exp\left[\frac{-1}{n+1}RTL(n)\right] \cdot \exp\left[\frac{RL(n+1)}{n+1}\right] + \frac{RS(n+1)}{n+1} \cdot \exp\left[\frac{RL(n+1)}{n+1}\right] \cdot \exp\left[\frac{n}{n+1}RTL(n)\right] \quad (36)$$

Thus, it can be seen that the cost function of equation 2 can be effectively evaluated using equation (36). That is, by suitable initialization of the variables RS(i) and RL(i) and RTL(n) for the first row of the image the cost function S can be calculated on a row by row basis as indicated by equation 36.

In a computer program implementation of the algorithm a for loop process each row of the image in turn. An initial value of RS(i) is calculated for the first row and stored in a variable RowProdSum. An initial value for RL(i) for the first row is also calculated and stored in a variable Row_Sum_Log. A variable S is then initialized and updated for each row with equation 23 being used to update values of RTL as appropriate. A variable wf is set to be equal 1.0/(i+1.0) which corresponds to the term $$\frac{1}{n+1}$$

in the above equations. Appropriate program code is shown in code fragment 1 below.

Two double precision floating point variables, A and RTB (which represents RTL), are used in the line-recursive structure shown below. The line number is denoted by i.

---
CODE FRAGMENT 1
---

```
{Process each image row, starting at row 0. The row number is i}
if(i==0)
{
    RTB = row_sum_log;
    double exp_term = exp(RTB);
    A = RowProdSum*exp_term;
}
else
{
    double wf = 1.0/(i+1.0);
    double exp_term = exp(wf*row_sum_log);
    double LineProdSumProd = wf*RowProdSum*exp_term;
    double RTA1_term1 = wf*i*A*exp(-wf*RTB);
    double RTA1_term2 = exp(wf*i*RTB);
    A = RTA1_term1*exp_term + LineProdSumProd*RTA1_term2;
    RTB = wf*(RTB*i + row_sum_log[colour]);
}
i = i + 1;
{when all rows are processed the final cost function value is A}
```

Figure 2:
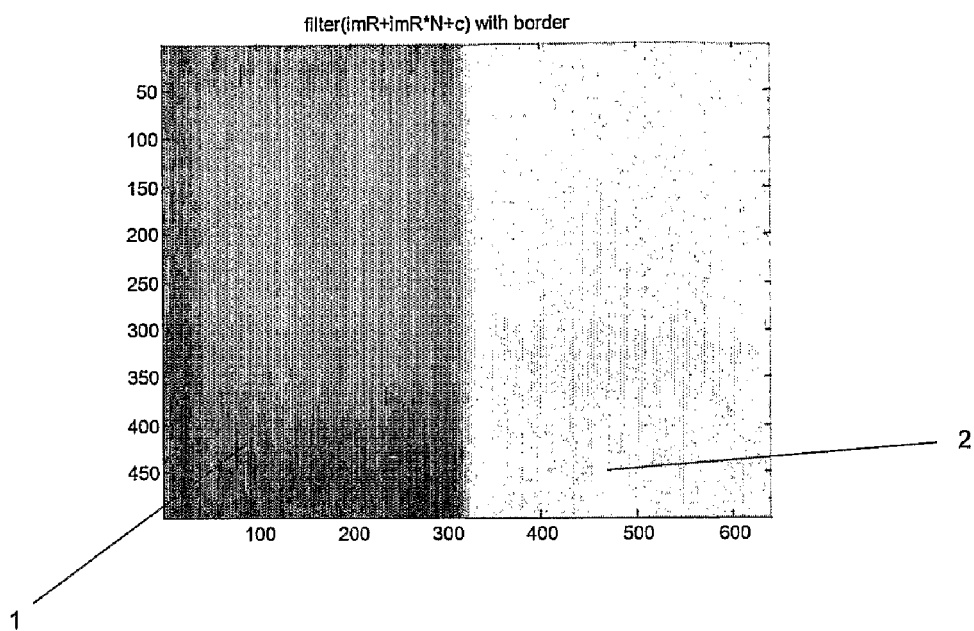
FIG. 2 is an example image to which processing in accordance with FIG. 1 is applied.

Application of the method illustrated in FIG. 1 to an example image shown as FIG. 2 is now described.

The image of FIG. 2 is a synthetic image that has been formed to illustrate the method of the described embodiment of the invention. The image comprises two regions with different intensity levels.

Initially an image was generated having an intensity of 30 in an area 1 and intensity of 120 in an area 2. A texture effect was simulated by adding a random number to each pixel. The random number was generated using a Normal distribution with zero mean and a standard deviation equal to one-tenth of the pixel value. The effect of airtight was simulated by adding a constant value of 50 to each pixel. In the image of FIG. 2 the mean value in the area 1 is 80 and the mean value in the area is 150.

Figure 3:
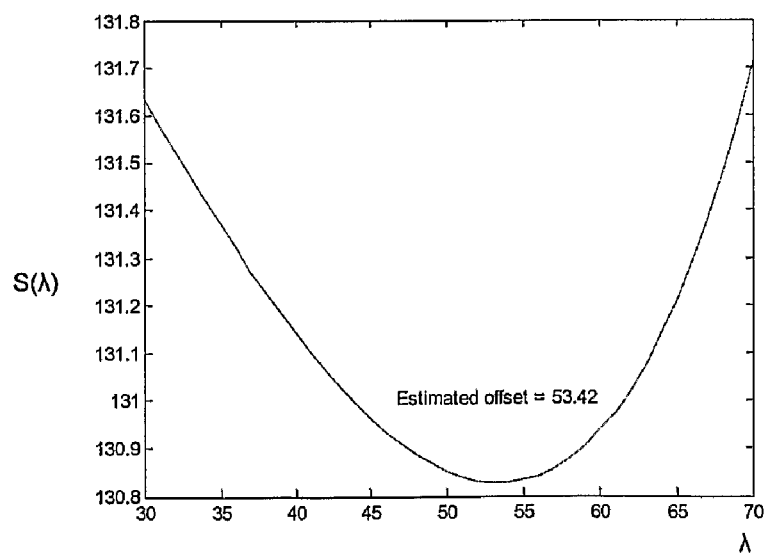
FIG. 3 is a graph showing values of a parametric function used in the processing of FIG. 1 when applied to the image of FIG. 2.

FIG. 3 shows a plot of the function S(λ) defined in equation (2) for differing values of λ. The values of S(λ) are generated using image data taken from all pixels of FIG. 2, and pixel values after application of an appropriate lowpass filter in the manner described above. It can be seen that S(λ) has a minimum value when λ=53.42. This is close to the accurate value of λ=50, (50 being the simulated airtight). Slight distortion along the edge of two patches results in the estimated offset being slightly offset from the true value of λ==50.

When pixel values in the vicinity of the edge are excluded from evaluation of S(λ), the function has a minimum at λ=49.9, which is very close to the true value. Elimination from the calculation of pixels near a sharp edge in an image can be carried out automatically by computing an edge strength measure (for example the modulus of the gradient) and excluding strong edges from the analysis.

The method set out above will work for any image in which there are at least two regions of different intensity. This is not restrictive in practice.

Equation (2) set out above can be modified for situations where the image contains a known level of random noise. In such a case S(λ) is defined by equation (37) below:

$$S(\lambda) = \frac{1}{K}\sum_{k=1}^{k=K}\left(\frac{(p_k - \overline{p_k})^2}{(\overline{p_k} - \lambda)^2 + \frac{A_v}{T_v}}\right)\exp\frac{1}{K}\sum_{k=1}^{k=K}\left(\ln(\overline{p_k} - \lambda)^2 + \frac{A_v}{T_v}\right) \quad (37)$$

where:
K is the number of pixels to be processed;
$p_k$ is the value of pixel k $\overline{p_k}$ is the value of pixel k after application of the lowpass filter described above;

$A_\nu$ denotes the variance of the additive noise component;

$T_\nu$ is a constant related to the image texture;

$\lambda$ is the value of the parameter to be determined; and $S(\lambda)$ is the function to be optimised.

Again, the value of $\lambda$ for which $S(\lambda)$ is a minimum will be a good estimate of the airtight component present in the image.

The preceding discussion has been concerned with monochrome images. For a colour image the three different colour channels (red, green and blue) may be analysed separately (and corrected separately), using either equation (2) or equation (37) set out above.

However an alternative method is preferred, in which a composite function is used and a three-variable optimisation process carried out. One such composite function is set out as equation (38):

$$S(\lambda_r, \lambda_g, \lambda_b) = \frac{1}{K}\left\{\sum_{k=1}^{k=K}\left(\frac{p_{k_r}-\overline{p_r}}{\overline{p_{k_r}}-\lambda_r}\right)^2 + \sum_{k=1}^{k=K}\left(\frac{p_{k_g}-\overline{p_{k_g}}}{\overline{p_{k_g}}-\lambda_g}\right)^2 + \sum_{k=1}^{k=K}\left(\frac{p_{k_b}-\overline{p_{k_b}}}{\overline{p_{k_b}}-\lambda_b}\right)^2\right\}\cdot\exp\left\{\frac{1}{K}\frac{\sum_{k=1}^{k=K}\ln(\overline{p_{k_r}}-\lambda_r)^2 + \sum_{k=1}^{k=K}\ln(\overline{p_{k_g}}-\lambda_g)^2 + \sum_{k=1}^{k=K}\ln(\overline{p_{k_b}}-\lambda_b)^2}{3}\right\} \quad (38)$$

where:

K is the number of pixels to be processed;

$p_{kr}$, $p_{kg}$, $p_{kb}$ are the values of pixel k for the red, green and blue channels respectively;

$\overline{p_{kr}}$, $\overline{p_{kg}}$, $\overline{p_{kb}}$ are the values of pixel k for the red, green and blue channels respectively after application of the low-pass filter described above;

$(\lambda_r, \lambda_g, \lambda_b)$ are the values of the parameters to be determined; and $S(\lambda_r, \lambda_g, \lambda_b)$ is the function to be optimised.

As before, subject to certain assumptions, (that the fractional variation in brightness is approximately independent of the actual brightness, and that the fractional variation is similar in the red, green and blue colour channels) the function $S(\lambda_r, \lambda_g, \lambda_b)$ has a stationary point (a minimum) when $(\lambda_r, \lambda_g, \lambda_b)$ indicates the component of each channel attributable to airtight.

The evaluation technique described above can be used for colour images using equation (38) above.

Here, the parameter RS referred to above is replaced by three RS parameters, one for each channel of the image. These are defined according to equations (39), (40) and (41) set out below:

$$RS_r(i) = \frac{1}{M}\sum_{m=1}^{M}\frac{(P_{r_{im}}-\tilde{P}_{r_{im}})^2}{(\tilde{P}_{r_{im}}-\lambda_{r_i})^2}, \quad (39)$$

$$RS_g(i) = \frac{1}{M}\sum_{m=1}^{M}\frac{(P_{g_{im}}-\tilde{P}_{g_{im}})^2}{(\tilde{P}_{g_{im}}-\lambda_{g_i})^2}, \quad (40)$$

$$RS_b(i) = \frac{1}{M}\sum_{m=1}^{M}\frac{(P_{b_{im}}-\tilde{P}_{b_{im}})^2}{(\tilde{P}_{b_{im}}-\lambda_{b_i})^2}, \quad (41)$$

Similarly, the parameter RL referred to above is replaced by three parameters, again one for each channel of the image, as shown in equations (42), (43) and (44):

$$RL_r(i) = \frac{1}{3M}\sum_{m=1}^{M}\ln(\tilde{P}_{r_{im}}-\lambda_{r_i})^2, \quad (42)$$

$$RL_g(i) = \frac{1}{3M}\sum_{m=1}^{M}\ln(\tilde{P}_{g_{im}}-\lambda_{g_i})^2, \quad (43)$$

$$RL_b(i) = \frac{1}{3M}\sum_{m=1}^{M}\ln(\tilde{P}_{b_{im}}-\lambda_{b_i})^2, \quad (44)$$

Similarly again, the parameter RTL is replaced by three values, one for each channel according to equation (45), (46) and (47) as set out below.

$$RTL_r(n) = \frac{1}{n}\sum_{i=1}^{n}RL_r(i), \quad (45)$$

$$RTL_g(n) = \frac{1}{n}\sum_{i=1}^{n}RL_g(i), \quad (46)$$

$$RTL_b(n) = \frac{1}{n}\sum_{i=1}^{n}RL_b(i), \quad (47)$$

Processing is carried out for a single channel at a time and accordingly a parameter S is again replaced by three parameters according to equations (48), (49) and (50):

$$S_r(n) = \frac{1}{n}\left[\sum_{i=1}^{n}RS_r(i)\right]\cdot\exp[RTL_r(n)], \quad (48)$$

$$S_g(n) = \frac{1}{n}\left[\sum_{i=1}^{n}RS_g(i)\right]\cdot\exp[RTL_g(n)], \quad (49)$$

$$S_b(n) = \frac{1}{n}\left[\sum_{i=1}^{n}RS_b(i)\right]\cdot\exp[RTL_b(n)], \quad (50)$$

Accordingly, equation 37 can then be rewritten as:

$$S(\lambda_{r1},\lambda_{g1},\lambda_{b1},\ldots,\lambda_{rn},\lambda_{gn},\lambda_{bn})=S_r(n)\cdot\exp[RTL_g(n)+RTL_b(n)]+S_g(n)\cdot\exp[RTL_b(n)+RTL_r(n)]+S_b(n)\cdot\exp[RTL_r(n)+RTL_g(n)] \quad (51)$$

And it will be appreciated that values of the variables S and RTL can be computed as in the single channel case described above. In a computational implementation the variable Row-ProdSum is replaced by a three element array and the variable Row_Sum_Log is again replaced by a three element array. The RTL variable RTB is again replaced by an appropriate three element array.

Figure 4:
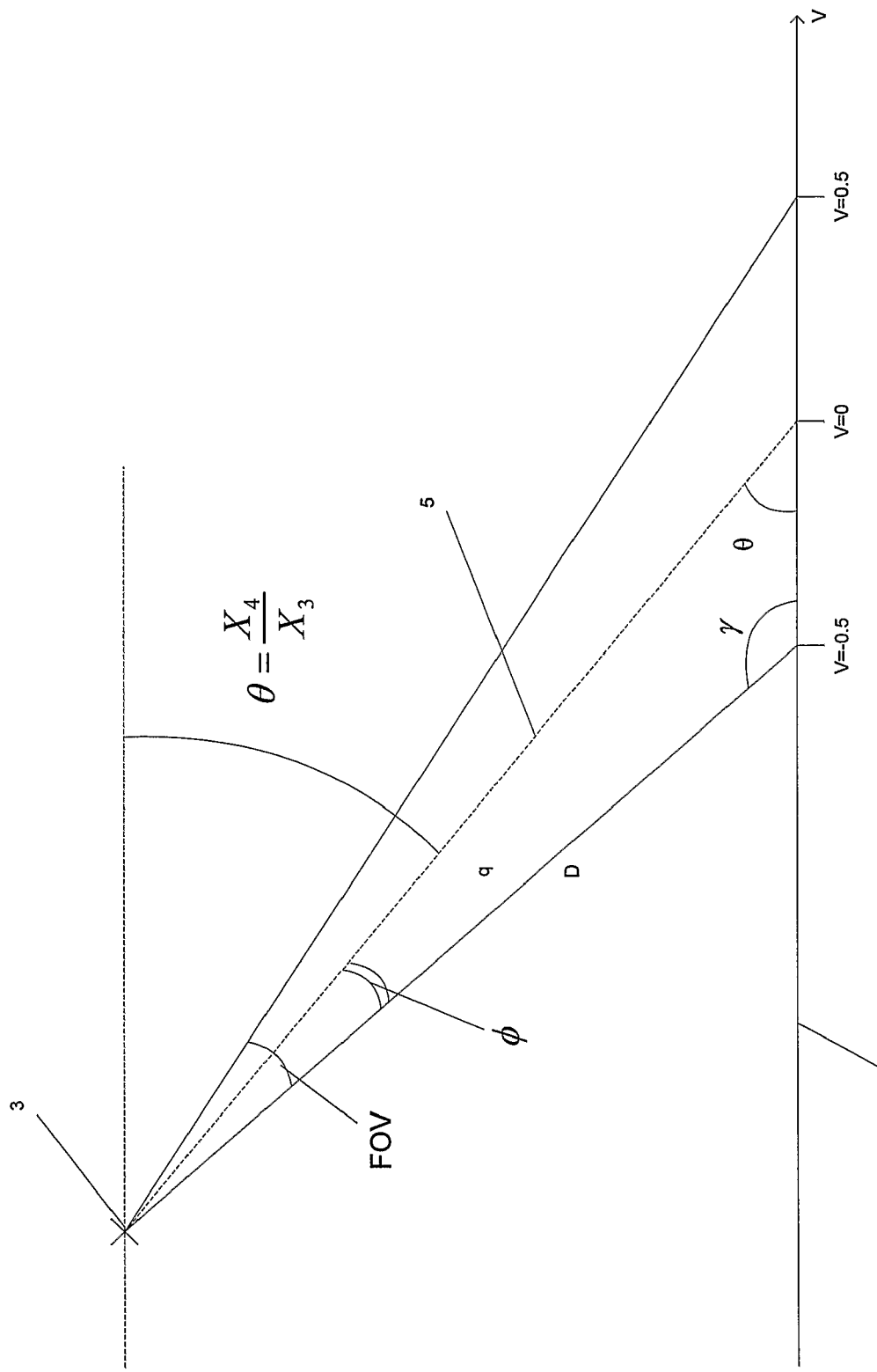
FIG. 4 is an illustration of scene geometry.

The component of airtight within an image may vary in dependence upon the distance between the camera, and a point in the scene represented by a pixel. FIG. 4 illustrates a camera 3 positioned to generate an image of a scene. The camera 3 is directed at an angle θ to the horizontal, and has a field of view angle FOV.

It is known that airtight (λ) will typically vary in dependence upon the distance between the camera 3 and the image plane 4, referred to as D, in accordance with equation (52):

$$\lambda \propto (1 - \exp(-\beta_{sc}(\omega) \cdot D)) \tag{52}$$

where $\beta_{sc}$ is the total volume scattering coefficient for light of wavelength ω. A normalized volume scattering $\beta_{sc}'(\omega)$ coefficient is defined, such that:

$$\beta_{sc}'(\omega) = \beta_{sc}(\omega) \cdot q, \tag{53}$$

Where q is the value of the distance D corresponding to the centre of the image. In the described embodiment of the present invention the normalized scattering coefficient $\beta_{sc}'$ is represented by three scalar variables $X_0$, $X_1$ and $X_2$, corresponding to nominal wavelengths in the red, green and blue colour bands respectively.

The geometry of the scene illustrated in FIG. 4 is, in general, unknown. Two further scalar variables, $X_3$ and $X_4$, are therefore defined as follows:

That is:

$$X_4 = FOV \tag{54}$$

$$X_3 = \frac{FOV}{\theta} \tag{55}$$

Where FOV is the field of view angle and θ is the angle between the horizontal and the distance from the camera to the center of the image.

$$\theta = \frac{X_4}{X_3} \tag{56}$$

All five parameters ($X_0$, $X_1$ $X_2$ $X_3$ $X_4$) are determined by multi-variable optimisation.

The distance between the camera and the image plane varies in dependence upon position within the image plane. This position is represented by a variable v which takes a value of 0.5 at one extreme, −0.5 at another extreme and 0 at the centre.

Applying the sin rule to FIG. 4.

$$\frac{D}{\sin\theta} = \frac{q}{\sin\gamma} \tag{57}$$

It can be seen that $$\gamma = 180 - (\theta + \phi) \tag{58}$$

Given that:

$$\phi = -vX_4 \tag{59}$$

then:

$$\gamma = 180 - (\theta - vX_4) \tag{60}$$

and:

$$\sin\gamma = \sin(\theta - vX_4) \tag{61}$$

So $D = \sin\theta \dfrac{q}{\sin\gamma}$ (62)

$$D = q\frac{\sin\theta}{\sin(\theta - vX_4)} \tag{63}$$

$$D = q\frac{\sin\dfrac{X_4}{X_3}}{\sin X_4\left(\dfrac{1}{X_3} - v\right)} \tag{64}$$

Substituting equation (64) into equation (52) gives the airtight of a pixel for a monochrome image or a single channel (e.g. the red channel) of a colour image;

$$\lambda(x_0 x_3 x_4) = C\left\{1 - \exp\left[-x_0 \frac{\sin(x_4/x_3)}{\sin\left(x_4\left[\dfrac{1}{x_3} - v\right]\right)}\right]\right\}, \tag{65}$$

where C is the constant of proportionality in equation (52). The term $\lambda(X_0, X_3, X_4)$ then replaces λ in equation (2) or (37). The value of constant C depends on the product of the atmospheric radiance and the camera gain. In general these parameters are not known. An estimate for C may be formed in various ways. One way is to use the highest pixel value in the image.

If the colour version of the equation (equation (38)) is used then $X_0$ is replaced with $X_1$ or $X_2$ for the green and blue channels as appropriate. This term is computed separately for each row of pixels in the image.

When the field of view angle is relatively small, approximately 15 degrees or less, the following approximation may be made.

$$\lambda(x_0 x_3 x_4) \approx \lambda(x_0 x_3) = C\left\{1 - \exp\left[-x_0 \frac{1/x_3}{\left[\dfrac{1}{x_3} - v\right]}\right]\right\}. \tag{66}$$

This expression involves only one geometrical parameter. This shows that the field of view angle (parameter $X_4$ in equation (67)) has little effect in practice. In the preferred implementation equation (56) is used but with a fixed value for $X_4$. If the field of view of the camera is not known, then $X_4$ is set to some small value, say 1 degree.

The preceding discussion has been concerned with estimating airtight in static images. It will be appreciated that the techniques described above can be applied to video data comprising a plurality of frames, by processing each frame in turn. When video data is processed in this way care must be taken to ensure that the image processing operations are sufficiently fast so as not to cause artefacts of "jerkiness" in the processed video data. Thus, it may be necessary to compromise image processing quality for the sake of speed.

Figure 5:
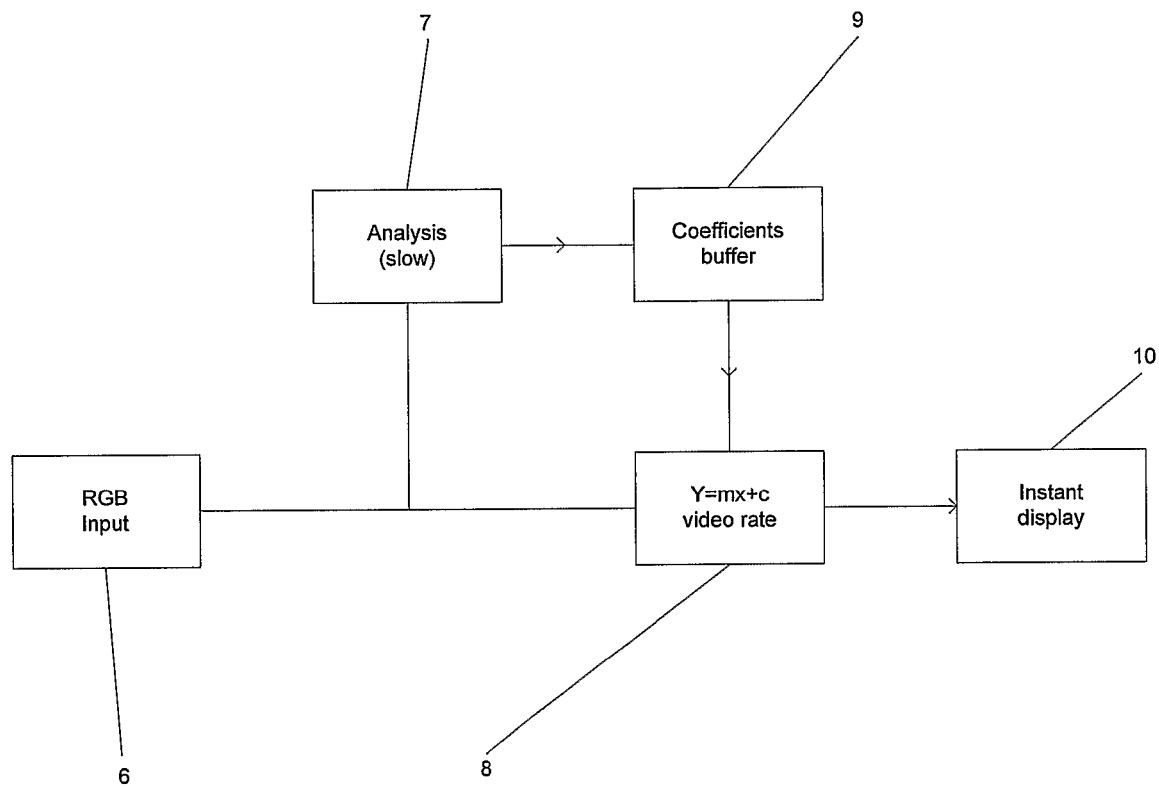
FIG. 5 is a schematic illustration of an implementation of an image processing method in accordance with the invention.

In accordance with some embodiments of the present invention image processing is carried out using an arrangement illustrated in FIG. 5. Colour input video data 6 in which each pixel of each frame is represented by separate red, green and blue channels is received and passed concurrently to an analysis module 7 and a video processing module 8. The analysis module operates relatively slowly and is configured to generate values for the parameters c and m of equation (1). Determination of c may be carried out, for example, using the method outlined above. Values of the parameters c and in are stored in a coefficients buffer 9.

Not all of the image data may be required for the image analysis. For example the image may be sub-sampled by a factor of two such that analysis is based upon only half of the pixel value. This saves time in the computation. Also the analysis is usually carried out for a pre-defined part of the image in order to avoid borders or screen annotation (which is sometimes used in CCTV installations).

The video processing module 8 operates by processing each pixel of a received frame in accordance with equation (1), reading appropriate values for the parameters c and m from the coefficients buffer 9. Data processed by the video processing module 8 is output to a display screen 10.

Given that the analysis module 7 operates slowly compared to the video processing module 8, the video processing module 8 will typically apply coefficients generated using an earlier frame of video data. Given that changes in airtight tend to happen over a prolonged period of time, this is found in practice to have little effect on image quality.

The analysis module 7 preferably produces values of c and m for each pixel of the processed frame. That is a method taking into account variation of airtight with distance from a camera position such as that described above or that described in EP0839361 is preferably used. In such embodiments of the invention a total of six tables are used, two for each colour channel. Each table has one entry for each pixel in the image. The red, green and blue channels are processed separately and then re-combined to form the final image.

The value of m can be adjusted to provide compensation for uneven illumination in addition to the airlight compensation if required. Several methods to estimate local illumination levels are available in the literature, such as that described in, for example Jobson, J., Rahman, Z., Woodell, G. A., "A multiscale retinex for bridging the gap between colour images and the human observation of scenes", IEEE Transactions on Image Processing, Vol. 6, Issue 7, July 1997, pp. 965-976.

Illumination estimation and compensation is now briefly described. Illumination compensation is based on an idea that illumination changes slowly, and that estimates of illumination distribution can be generated using a low pass filter. It is known that low pass filters such as the homomorphic filter can be used to estimate illumination for the purposes of image enhancement. This is described in, for example, Jobson, Rahman and Woodell referenced above.

Illumination estimation methods of the type described above are based on the Lambertian model for diffuse reflection. This is described in Anya Hurlbert, "Formal connections between lightness algorithms", J. Opt. Soc. Am. A, Vol. 3, No. 10, pp. 1684-1693, October 1986. If the visible surfaces in an image have a Lambertian characteristic and the illumination is confined to a narrow range of wavelengths then:

$$I(x, y) = R(x, y)L(x, y) \quad (67)$$

$$R(x, y) = \frac{I(x, y)}{L(x, y)} \quad (68)$$

where I(x,y) is the intensity value at pixel (x,y), R(x,y) is the scalar reflectance factor and L(x,y) is a scalar irradiance value. The image processing procedure is simple; first form an estimate for L(x,y) and then scale by c/L(x,y), where the constant c is chosen to keep the pixels within the display range.

This model can be generalized to colour images under the assumption that narrow-band filters are used for each colour channel. Even when the spectrum is localized using conventional RGB filters the model defined by (68) gives an approximation to the true response. The benefits of such decomposition include the possibility of removing illumination effects of back/front lighting, enhancing shots that include spatially varying illumination such as images that contain shadows.

Various methods have been proposed for estimation of the illumination function L(xy). In Akira Suzuki, Akio Shio, Hiroyuki Arai, and Sakuichi Ohtsuka, "Dynamic shadow compensation of aerial images based on color and spatial analysis", Pattern Recognition, 2000. Proceedings. 15th International Conference on, 3-7 September 2000, Vol. 1, pp. 317-320., a morphological smoothing filter is used. The homomorphic filter, described by Thomas Stockham, Jr. in "Inage processing in the context of a visual model,", Proc. IEEE, Vol. 60, No. 7, pp. 828-842, 1972, is an early illumination compensation technique. The retinex algorithm, described by Jobson, Rahman, and Woodell in "Properties and performance of a centre/surround retinex", IEEE Transactions on Image Processing, Vol. 6, No. 3, 1997, pp. 451-462, is a more recent method.

The illumination estimation and compensation techniques described above can be applied in the context of a system such as that illustrated in FIG. 5. Specifically, the analysis module 7 can estimate illumination, while the video processing module 8 can process data to perform illumination compensation.

Although preferred embodiments of the invention have been described above, it will be appreciated that various modifications can be made to those embodiments without parting from the spirit and scope of the present invention as defined by the amended claims.

The description set out above has been concerned with image processing techniques concerned with removing the effects of airtight from an image. It will be appreciated that there are other sources of image offsets apart from the airtight effect. In particular image offsets can be generated by the thermal response of a camera—the so-called "dark current". Offsets can also be generated by dirt on the camera lens or protective window. Additionally noise can be caused by so called "pedestal" errors. Some video standards, including certain variants of the PAL standard, use a non-zero voltage level to represent black. This level is known as the "Pedestal". If the video decoder males an inappropriate allowance for the pedestal the effect is to shift all of the brightness levels either up or down. All of these types of offsets can be detected (and mitigated) by the methods described above.

The invention claimed is:

1. A method of processing image data representing an image of a scene to generate an estimate of noise present in the image data, the method comprising carrying out the following steps using a processor:
    generating filtered image data from initial image data representing the image of the scene, said filtered image data comprising spatially filtered pixel values determined using pixel values of pixels from the initial image data;
    evaluating a function for different values of an estimate of noise present in the initial image data, said function incorporating the term $\overline{p}_k - \lambda$ in the denominator, where $\overline{P}_k$ is the spatially filtered pixel value of pixel k after application of a spatial filter and $\lambda$ is the estimate of said noise; and
    determining from said function an estimate of said noise for which said function has an optimum value.

2. A method according to claim 1, wherein the initial image data comprises pixel values for each of a plurality of the pixels and said function takes as input at least a subset of said pixel values.

3. A method according to claim 1, wherein said generating step comprises generating said filtered pixel values by spatial low pass filtering at least some of said initial image data.

4. A method according to claim 1, wherein said optimum value of said function is a stationary point of said function.

5. A method according to claim 4, wherein said stationary point is a minimum.

6. A method of processing image data representing an image of a scene to generate an estimate of noise present in the image data, the method comprising carrying out the following steps using a processor:
evaluating a function for different values of an estimate of noise present in the image data, said function taking as input the estimate of said noise; and
determining an estimate of said noise for which said function has an optimum value;
wherein said function is of the form:

$$S(\lambda) = \frac{1}{K}\sum_{k=0}^{k<K}\left(\frac{p_k - \overline{p_k}}{\overline{p_k} - \lambda}\right)^2 \cdot \exp\frac{1}{K}\sum_{k=0}^{k<K}(\ln(\overline{p_k} - \lambda)^2)$$

where:
K is the number of pixels to be processed;
$p_k$ is the value of pixel k;
$\overline{p_k}$ is the value of pixel k after application of a low-pass filter;
$\lambda$ is the value of the estimate; and
$S(\lambda)$ is the function to be optimised.

7. A method according to claim 6, wherein said optimum value is determined using a numerical analysis technique.

8. A method according to claim 6, wherein said estimate is initially zero.

9. A method according to claim 1, comprising generating a plurality of estimates, each estimate being an estimate of noise in a respective subset of pixels of said image.

10. A method according to claim 9, where a plurality of estimates are generated on the basis of distance between a point of view from which an image is taken and a point in a scene represented by a pixel.

11. A method according to claim 1, further comprising:
removing said estimate of said noise for which said function has an optimum value by processing each pixel of said image.

12. A method according to claim 11, further comprising:
generating output pixel values as a result of said processing of each pixel; and
multiplying said output pixel values by a predetermined coefficient.

13. A non-transitory computer-readable medium for processing image data representing an image of a scene, said computer-readable medium carrying computer readable instructions that comprise:
computer instructions for generating filtered image data from initial image data representing the image of the scene, said filtered image data comprising spatially filtered pixel values determined using pixel values of pixels in the initial image data;
computer instructions for evaluating a function for different values of an estimate of noise present in the initial image data, said function incorporating the term $\overline{p_k}-\lambda$ in the denominator, where $\overline{p_k}$ is the spatially filtered pixel value of pixel k after application of a spatial filter and $\lambda$ is the estimate of said noise; and
computer instructions for determining from said function an estimate of said noise for which said function has an optimum value.

14. A computer apparatus for generating an estimate of noise present in image data representing an image, comprising:
a program memory containing processor readable instructions; and
a processor configured to read and execute instructions stored in said program memory;
wherein said processor readable instructions comprise instructions configured to cause the computer apparatus to: (i) generate spatially filtered pixel values from initial image data representing the image, said filtered image data comprising spatially filtered pixel values determined using pixel values of pixels in the initial image data, ii evaluate a function for different values of an estimate of noise present in the initial image data, said function incorporating the term $\overline{p_k}-\lambda$ in the denominator, where $\overline{p_k}$ is the spatially filtered pixel value of pixel k after application of a spatial filter and $\lambda$ is the estimate of said noise; and (iii) determine from said function an estimate of said noise for which said function has an optimum value.

* * * * *